United States Patent
Tai et al.

(10) Patent No.: US 11,372,621 B2
(45) Date of Patent: Jun. 28, 2022

(54) CIRCUITRY FOR FLOATING-POINT POWER FUNCTION

(71) Applicant: Apple Inc., Cupertino, CA (US)

(72) Inventors: Anthony Y. Tai, San Jose, CA (US); Liang-Kai Wang, Austin, TX (US); Ian R. Ollmann, Los Gatos, CA (US); Anand Poovekurussi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 56 days.

(21) Appl. No.: 16/893,051

(22) Filed: Jun. 4, 2020

(65) Prior Publication Data

US 2021/0382687 A1   Dec. 9, 2021

(51) Int. Cl.
| | |
|---|---|
| G06F 7/483 | (2006.01) |
| G06F 9/30 | (2018.01) |
| G06F 7/499 | (2006.01) |
| G06F 9/38 | (2018.01) |
| G06F 1/3206 | (2019.01) |

(52) U.S. Cl.
CPC ............ *G06F 7/483* (2013.01); *G06F 1/3206* (2013.01); *G06F 7/49947* (2013.01); *G06F 9/3001* (2013.01); *G06F 9/3836* (2013.01)

(58) Field of Classification Search
CPC ....................................................... G06F 7/483
See application file for complete search history.

(56) References Cited

U.S. PATENT DOCUMENTS

| | | | |
|---|---|---|---|
| 7,085,940 B2 | 8/2006 | Luick | |
| 8,429,217 B2 | 4/2013 | Schmookler | |
| 9,477,442 B2 | 10/2016 | Hondo | |
| 2009/0083519 A1* | 3/2009 | Yang | G06F 7/483 |
| | | | 712/36 |
| 2014/0067894 A1 | 3/2014 | Plondke et al. | |
| 2016/0364209 A1* | 12/2016 | Nystad | G06F 7/49915 |

OTHER PUBLICATIONS

Florent de Dinechin, Pedro Echeverria, Marisa Lopez-Vallejo, Bogdan Pasca. Floating-Point Exponentiation Units for Reconfigurable Computing. ACM Transactions on Reconfigurable Technology and Systems (TRETS), ACM, Jun. 2013, (1), pp. 4:1-4:15. ff10.1145/2457443.2457447ff. ffensl-00718637 (Year: 2013).*

* cited by examiner

*Primary Examiner* — Michael J Metzger
(74) *Attorney, Agent, or Firm* — Kowert, Hood, Munon, Rankin & Goetzel, P.C.; Michael B. Davis; Dean M. Munyon (57) ABSTRACT

Techniques are disclosed relating to floating-point circuitry configured to perform a corner check instruction for a floating-point power operation. In some embodiments, the power operation is performed by executing multiple instructions, including one or more instructions specify to generate an initial power result of a first input raised to the power of a second input as $2^{(second\ input * log_2(first\ input))}$. In some embodiments, the corner check instruction operates on the first and second inputs and outputs output a corrected power result based on detection of a corner condition for the first and second inputs. Corner check circuitry may share circuits with other datapaths. In various embodiments, the disclosed techniques may reduce code size and power consumption for the power operation.

20 Claims, 7 Drawing Sheets

| Case | Input Pattern pow(x,y) | Expected Result |
|---|---|---|
| 0 | pow(+0,y) | Returns +∞ for y an odd integer < 0 |
| 1 | pow(-0,y) | Returns -∞ for y an odd integer < 0 |
| 2 | pow(±0,y) | Returns +∞ for y < 0, finite, and not an odd integer |
| 3 | pow(±0,-∞) | Returns +∞ |
| 4 | pow(+0,y) | Returns +0 for y an odd integer > 0 |
| 5 | pow(-0,y) | Returns -0 for y an odd integer > 0 |
| 6 | pow(±0,y) | Returns +0 for y > 0 and not an odd integer |
| 7 | pow(-1,±∞) | Returns 1 |
| 8 | pow(+1,y) | Returns 1 for any y, even a NaN |
| 9 | pow(x,±0) | Returns 1 for any y, even a NaN |
| 10 | pow(x,y) | Returns a NaN for finite x < 0 and finite non-integer y |
| 11 | pow(x,-∞) | Returns +∞ for |x| < 1 |
| 12 | pow(x,-∞) | Returns +0 for |x| > 1 |
| 13 | pow(x,+∞) | Returns +0 for |x| < 1 |
| 14 | pow(x,+∞) | Returns +∞ for |x| > 1 |
| 15 | pow(-∞,y) | Returns -0 for y an odd integer < 0 |
| 16 | pow(-∞,y) | Returns +0 for y < 0 and not an odd integer |
| 17 | pow(-∞,y) | Returns -∞ for y an odd integer > 0 |
| 18 | pow(-∞,y) | Returns +∞ for y > 0 and not an odd integer |
| 19 | pow(+∞,y) | Returns +0 for y < 0 |
| 20 | pow(+∞,y) | Returns +∞ for y > 0 |
| 21 | pow(x,NaN) | Returns +NaN when x!=1 and rational or x is infinity |
| 22 | pow(NaN,y) | Returns +NaN when y!=±0 |
| 23 | pow(NaN,NaN) | Returns +NaN |

CIRCUITRY FOR FLOATING-POINT POWER FUNCTION

BACKGROUND

Technical Field

This disclosure relates generally to floating-point circuitry and more particularly to circuitry configured to detect corner cases for the floating-point power function.

Description of the Related Art

The floating-point power function (e.g., to determine the value of $x^y$ where x and y are floating-point inputs) is often used in graphics and compute applications. Typically, designers rely on software libraries that often use many instructions (e.g., ten or more) to implement the core function (e.g., $2^{(y*log\ 2(x))}$) and check all of the corner cases to correctly implement the power function. Execution of these instructions may use substantial processing time and power.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "floating-point unit configured to execute floating-point instructions" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

DETAILED DESCRIPTION

Overview of Floating-Point Datapath with Corner Check Circuitry

The floating-point power function (e.g., to determine the value of $x^y$) is often used in graphics and compute applications. Traditionally, the power function is often implemented using the core function (e.g., $2^{(y*log\ 2(x))}$) and instructions to check all of the corner cases to correctly implement the power function. These instructions may increase code size and execution of these instructions may use substantial processing time and power.

In disclosed embodiments, a processor includes corner check circuitry configured to execute one or more corner check instructions to check corner cases for the power function. In some cases, the corner check circuitry is configured to execute a single instruction to check all corner cases for an implementation of the power function. The corner check circuitry may share circuitry with other datapaths which may reduce increases in chip area. For example, the corner check circuitry may share odd integer detection circuitry with a round-to-integer datapath. The disclosed techniques may advantageously reduce code size, increase performance, reduce power consumption, or any combination thereof.

Figure 1:
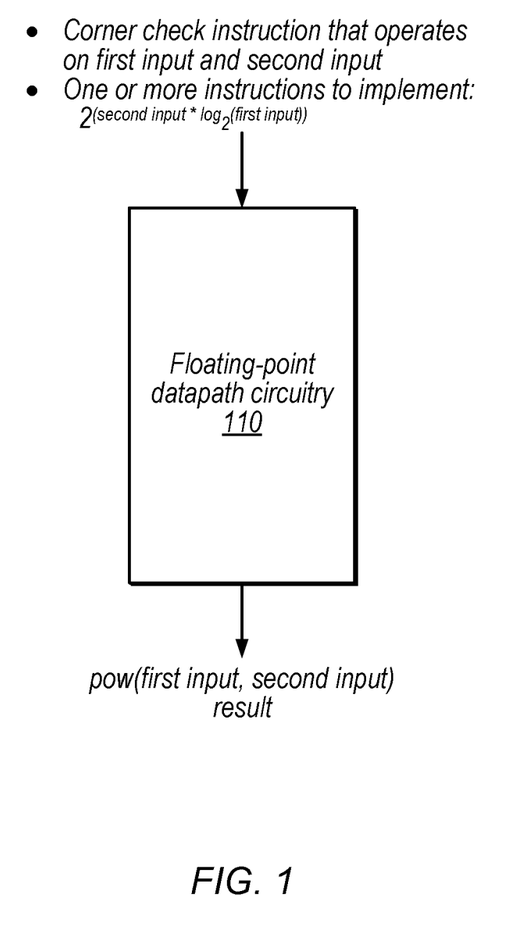
FIG. 1 is a block diagram illustrating example floating-point datapath circuitry configured to execute a corner check instruction for a power function, according to some embodiments.

FIG. 1 is a block diagram illustrating example floating-point datapath circuitry configured to execute a corner check instruction for a power function, according to some embodiments. In the illustrated embodiment, a processor (e.g., a central processing unit or graphic processor) includes floating-point datapath circuitry 110. Circuitry 110 receives one or more instructions to implement the function $2^{(second\ input * log_2(first\ input))}$ and also a corner check instruction that operates on the first and second inputs. In some embodiments, these received instructions may implement the function pow(first input, second input), which raises the first input to the power of the second input. Note that the received instructions may pass through various processing stages before reaching floating-point datapath circuitry 110. For example, instructions may be decoded, checked for hazards, have their operands fetched, etc. before being issued to floating-point datapath circuitry 110.

Floating-point datapath circuitry 110 may include multiple different units configured to perform different types of instructions. For example, floating-point datapath circuitry 110 may include separate paths for operations of different precisions (e.g., 16 or 32-bit precisions), a separate path for complex instructions, a separate path for the corner check instruction, etc. In some embodiments, corner check circuitry in floating-point datapath circuitry 110 is configured to share circuitry with other execution units, which may reduce overall chip area. In single-instruction multiple-data (SIMD) embodiments, floating-point datapath circuitry may include multiple parallel corner check circuits configured to separately check different threads of a SIMD group for corner cases for a power function performed for the SIMD group.

Figure 2:
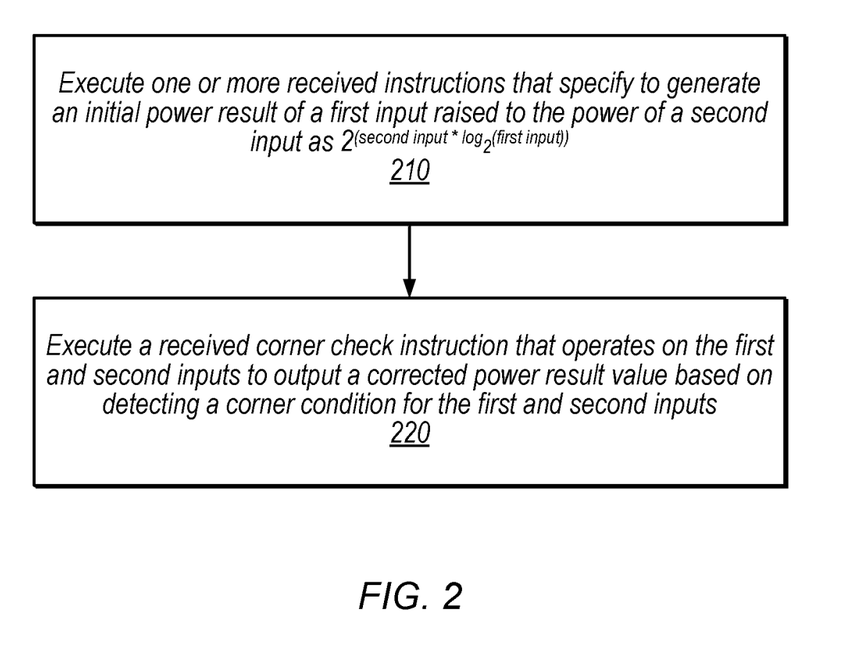
FIG. 2 is a flow diagram illustrating an example method for performing a power function using a corner check instruction, according to some embodiments.

FIG. 2 is a flow diagram illustrating an example method for performing a power function using a corner check instruction, according to some embodiments. The method shown in FIG. 2 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 210, in the illustrated embodiment, pipelined floating-point datapath circuitry executes one or more received instructions that specify to generate an initial power result of a first input raised to the power of a second input. In the illustrated example, the initial power result is generated according to the formula $2^{(second\ input * log_2(first\ input))}$ where the power operation specifies to raise the first input to the power of the second input. This formulation may be implemented using common instructions implemented by most processor but may provide incorrect results for a number of corner cases. For example, the expression may be evaluated using a binary logarithm ($log_2$) instruction, a multiply instruction, and a two-to the-power-of ($2^x$) instruction.

In some embodiments, the power function is implemented using only four instructions (e.g., the three previously mentioned and a corner check instruction). In other embodiments, additional instructions may be used to evaluate the core formula (or some other formula), multiple corner case check instructions may be used, or both. In various embodiments, processor circuitry supports checking multiple corner cases using one corner check instruction, e.g., where traditional processors would use different instructions to check ones or subsets of the multiple corner cases.

At 220, in the illustrated embodiment, corner check circuitry in the pipelined floating-point datapath circuitry executes a received corner check instruction that operates on the first and second inputs. Based on detecting a corner condition for the first and second inputs, the corner check circuitry outputs a corrected power result value. Note that detecting a corner condition "for the first and second inputs" may include detecting that one of the inputs has a particular value or a value in a particular set of values (and the value of the other input may not be considered) or determining whether the combination of the two inputs meets a predetermined condition, for different corner cases. For example, pow(+1,y) is a corner case that returns 1 for any value of y but pow(x,+∞) is a corner case that may return different values depending on whether the absolute value of x is smaller than one.

In some embodiments, the corner check instruction receives the initial power result as an operand (e.g., to negate the initial power result if needed).

In some embodiments, the corner check circuitry shares circuitry with other datapaths. For example, in some embodiments, the corner check circuitry includes routing circuitry configured to utilize first circuitry that the apparatus is also configured to use for other floating-point operations performed by the floating-point pipeline, where the first circuitry includes at least one of: comparator circuitry and circuitry configured to detect a particular floating-point value. As another example, the corner check circuitry may include odd integer detection circuitry that the apparatus is also configured to use for round to integer operations, float-to integer conversion circuitry, range reduction circuitry, etc.

In some embodiments, the following set of example instructions implements a power function:

```
float pow(float x, float y) {
    float r0;
    r0 = log2 ( abs(x) );
    r0 = mul (y, r0);
    r0 = exp2(r0);
    r0 = pow_fixup(x, y, r0);      // example corner check instruction
    return r0;
}
```

Where log 2 determines the binary logarithm of a floating-point input (the power to which the value 2 must be raised to obtain the input), abs determines the absolute value of a floating point input, mul multiplies two floating-point inputs, exp2 determines two to power of a floating point input, and pow_fixup is a corner check instruction. In some embodiments, these instructions are included in the instruction set architecture (ISA) of a graphics processor. These instructions may be generated by a compiler, for example. In some embodiments, one or more of the instructions are micro-code instructions generated based on an ISA instruction, e.g., by decoder circuitry. In the code example above, the pow_fixup corner check instruction receives a first input operand x, a second input operand y, and an initial power result r0 and outputs either the initial power result or a corrected output.

The following pseudocode represents example operations that corner check circuitry is configured to perform for a corner check instruction, in some embodiments. While this code is included for purposes of explanation, the corner check circuitry includes dedicated circuitry for performing the specified operations in various embodiments.

```
float pow_fixup (float x, float y, float r0){
    float r;
    unsigned int selection = 0;
    if (((isNegative(x) && isOne(x)) && isInfinity(y)) ||
    (isPositive(x) && isOne(x)) ||
    isZero(y)) {
        selection = 0;
    } else if ((isNegative(x) && !isNaN(x)) && y_is_finite_odd_integer) {
        selection = 2;
    } else if (x_less_than_0 && !isNegInfinity(x) && !isNaN(y) &&
    !isInfinity(y) && !y_is_integer) {
        selection = 1;
    } else {
        selection = 3; // may land at default case for switch below
    }
    if (!isNaN(x) && (isPositive(y) && isOne(y)))
        selection = 4;
    switch (selection) {
        case 4:
            r = x; break;
        case 0:
            r = 1.0; break;
        case 1:
            r = NaN; break; // canonical NaN
        case 2:
            r = -r0; break;
        default:
            r = r0; break;
    }
    return r;
}
```

In this example, the pow_fixup instruction passes the initial power result in r0 if no corner cases are found, but may output x, 1, NaN, or −r0 for corresponding corner cases. To perform these operations, corner check circuitry may include various circuit elements, such as comparators, circuitry configured to detect certain values (or types of values such as negative values, integer values, etc.), logic such as AND gates and OR gates, multiplexer circuitry configured to select from among potential output values, etc. As discussed in detail below, corner check circuitry may share some of this circuitry with other datapaths, e.g., using routing circuitry to access the shared circuitry. The example operations in the pseudocode above checks for cases 7-10 of the example corner cases of FIG. 5, discussed in detail below. The example operations further check for a sign bit flip (when the first input is negative and the second input is a finite odd integer) and for situations where y is one and x is returned. Speaking generally, corner check circuitry may check for only a subset of corner cases needed for a completely correct power function, according to some standard. For example, corner check circuitry may not check certain known corner cases, e.g., because those cases are determined not to affect results in ways that are relevant to certain applications such as graphics processing. In other embodiments or modes, the corner check circuitry may check for all known corner cases to implement a completely correct power function.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

Example Shared Datapath Circuitry

Figure 3:
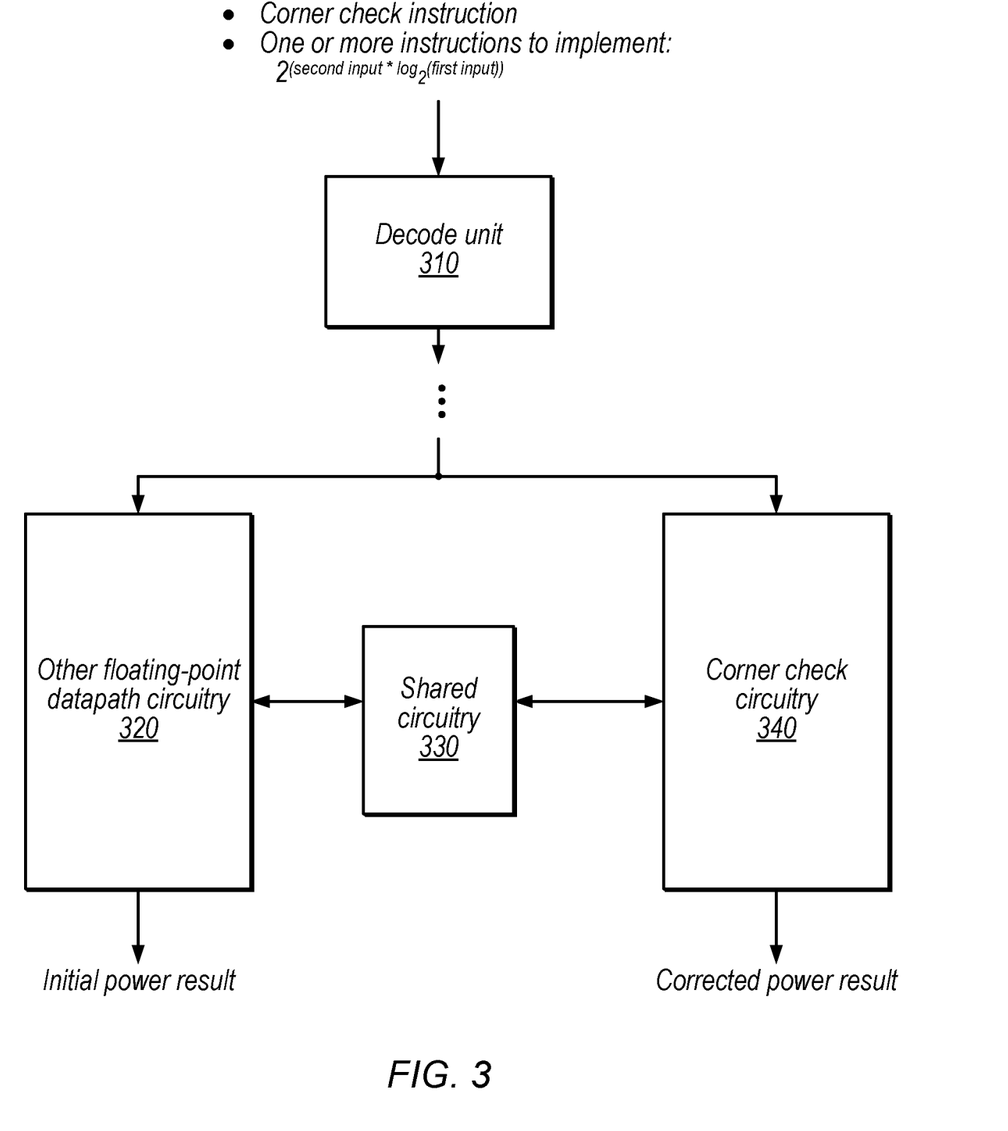
FIG. 3 is a block diagram illustrating example pipeline circuitry in more detail, according to some embodiments.

FIG. 3 is a block diagram illustrating example pipeline circuitry in more detail, according to some embodiments. In the illustrated embodiment, the pipeline includes a decode unit, one or more additional pipeline stages (not explicitly shown) such as hazard check, operand read, issue, etc., other floating-point datapath circuitry 320, shared circuitry 330, and corner check circuitry 340. In the illustrated example, corner check circuitry 340 shares circuitry with another floating-point datapath.

In some embodiments, portions of the pipeline may be shared by floating-point instructions and other types of instructions (e.g., integer instructions). An issue stage (not shown) may send instructions to the appropriate execution unit, e.g., based on the type of instruction. The pipeline may include multiple types of floating-point datapath circuitry configured to perform different types of instructions.

Decode unit 310, in some embodiments, is configured to recognize one or more corner check instructions for the floating-point power function. These corner check instructions may be included in the instruction set architecture for the processor and may be generated by a compiler based on compiling code for a power function in a higher-level programming language. In other embodiments, one or more corner check instructions may be micro-operations generated by the decode unit based on a decoded instruction.

Other floating-point datapath circuitry 320 may be configured to perform various types of floating-point operations in a pipelined fashion over multiple clock cycles. In the illustrated embodiment, other floating-point datapath circuitry generates an initial power result, e.g., by executing multiple instructions. The multiple instructions may use multiple types of floating-point execution units. The device may store the initial power result in a register in a register file, for example.

Shared circuitry 330, in the illustrated embodiment, is shared by corner check circuitry 340 and other floating-point datapath circuitry 320. At least a portion of shared circuitry 330 may already be included in a traditional design and corner check circuitry may include routing circuitry configured to use this circuitry for corner case detection. Shared circuitry 330 may include, without limitation: comparator circuitry, circuitry configured to detect a specific value such as zero or NaN, circuitry configured to detect an odd integer, etc.

Corner check circuitry 340, in the illustrated embodiment, is configured to perform one or more corner check instructions using shared circuitry 330 to generate a corrected power result, if a corner case is detected. In some embodiments, corner check circuitry 340 is configured to check multiple corner cases in a single pass through the pipeline. In some embodiments, corner check circuitry 340 is configured to check whether a sign bit flip is needed for the initial power result, e.g., when the first input is negative and the second input is a finite odd integer.

Figure 4:
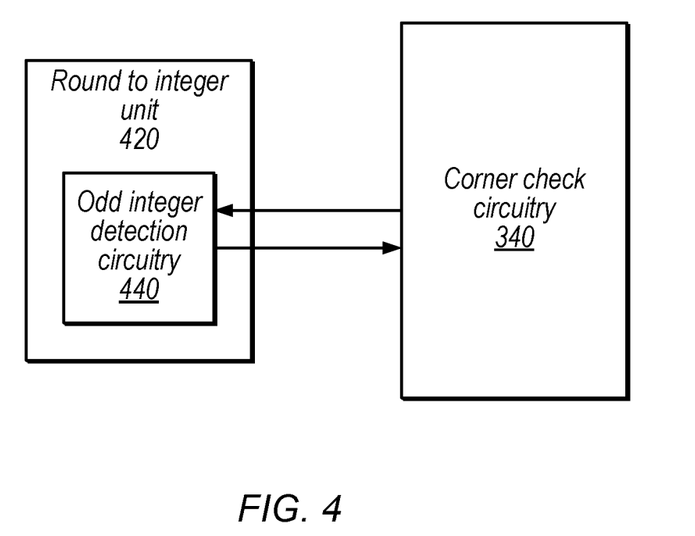
FIG. 4 is a block diagram illustrating a specific example of sharing odd integer detection circuitry, according to some embodiments.

FIG. 4 is a block diagram illustrating a specific example of sharing odd integer detection circuitry, according to some embodiments. In the illustrated embodiment, the processor includes round to integer unit 420 and corner check circuitry 340. Round to integer unit 420, in the illustrated embodiment, includes circuitry configured to detect odd integers.

In some embodiments, the following pseudocode represents operations that the odd integer detection circuitry 440 is configured to perform, where y is a 32-bit floating-point input being tested:

```
mask[23:0] = (1 << (8'h24-(y[30:23] – 8'h7f)) – 1);
y_has_fraction = (y[30:23]<8'd127) & (y[30:23]!=8'b0) | ( |(ex1_flr_addend[22:0]
    & y[22:0]));
mask[23:0] = {ex1_flt2fix_mask[22:0], y[30:23] == 8'd150};
y_lsb_odd = |( mask[23:0] & {1'b1, y[22:0]});
y_is_odd_int = ~y_has_fraction & y_lsb_odd;
``` where the operator "|(bit array)" is a reduction OR of the bit array, the ex1_fir_addend is used to construct the mask to identify the fraction part of the input floating-point value, and the ex1_flt2fix_mask is used to identify the first bit on the left of the decimal point when floating-point is represented as a decimal fraction.

Thus, circuitry 440 may receive a floating-point input and output a signal (e.g., a bit) indicating whether the input is an odd integer. In some embodiments, odd integer detection circuitry 440 includes shift circuitry, adder circuitry, XOR gates, AND gates, etc. configured to implement the expressions above over one or more clock cycles. In some embodiments, multiplexer circuitry may select between the corner check circuitry and round to integer unit 420 to send an input to the odd integer detection circuitry 440 in a given clock cycle. Similarly, de-multiplexer circuitry may select an appropriate datapath to receive the output of circuitry 440 in a given cycle. As shown, routing circuitry may allow corner check circuitry 340 to access circuitry of another unit to facilitate one or more corner checks.

Example Corner Cases

Figure 5:
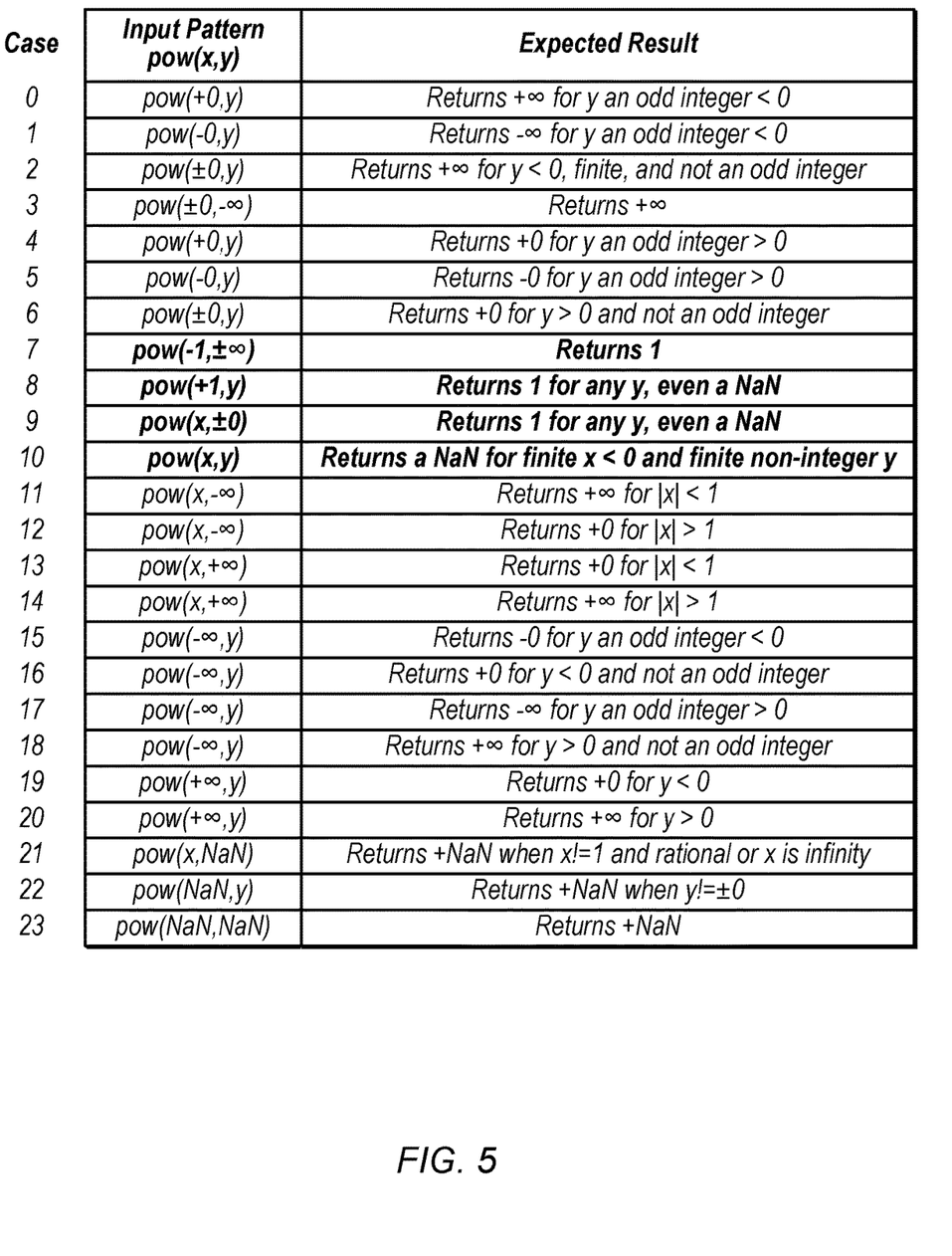
FIG. 5 is diagram illustrating example corner cases, according to some embodiments.

FIG. 5 is a diagram illustrating twenty-four example corner cases, according to some embodiments. As discussed above, in addition to these cases, corner check circuitry 340 is also configured to check whether a sign bit flip is needed for the initial power result in some embodiments. In some embodiments, corner check circuitry 340 may be configured to detect only a subset of the listed cases, may be configured to detect additional cases not shown, or both. In the following discussion of the example of FIG. 5, x is the "first input," y is the "second input," and the returned value is a corrected power result.

The example cases of FIG. 5 correspond to the examples in the C standard "C11 standard, section F.10.4.4" but corner check circuitry may be configured to check various other appropriate sets or subsets of cases in various embodiments.

For case 0, in the illustrated example, the first input is positive zero and the second input is an odd integer smaller than zero and the corrected power result is positive infinity; for case 1 the first input is negative zero and the second input is an odd integer smaller than zero and the corrected power result is negative infinity; for case 2 the first input is positive or negative zero and the second input is an odd integer smaller than zero and the corrected power result is negative infinity; for case 3 the first input is positive or negative zero and the second input is smaller than zero, finite, and not an odd integer and the corrected power result is positive infinity; for case 4 the first input is positive zero and the second input is an odd integer greater than zero and the corrected power result is positive zero; for case 5 the first input is negative zero and the second input is an odd integer greater than zero and the corrected power result is negative zero; for case 6 the first input is positive or negative zero and the second input is an greater than zero and not an odd integer and the corrected power result is positive zero; for case 7 the first input is negative one and the second input is positive or negative infinity and the corrected power result is positive 1; for case 8 the first input is positive one and the corrected power result is positive 1; for case 9 the second input is positive or negative zero and the corrected power result is positive 1; for case 10 the first input is smaller than zero and the second input is a finite non-integer and the corrected power result is positive not a number (NaN); for case 11 the absolute value of the first input is smaller than one and the second input is negative infinity and the corrected power result is positive infinity; for case 12 the absolute value of the first input is greater than one and the second input is negative infinity and the corrected power result is positive zero; for case 13 the absolute value of the first input is smaller than one and the second input is positive infinity and the corrected power result is positive zero; for case 14 the absolute value of the first input is greater than one and the second input is positive infinity and the corrected power result is positive infinity; for case 15 the first input is negative infinity and the second input is an odd integer smaller than zero and the corrected power result is negative zero; for case 16 the first input is negative infinity and the second input is smaller than zero and not an odd integer and the corrected power result is positive zero; for case 17 the first input is negative infinity and the second input is an odd integer greater than zero and the corrected power result is negative infinity; for case 18 the first input is negative infinity and the second input is greater than zero and not an odd integer and the corrected power result is positive infinity; for case 19 the first input is positive infinity and the second input is smaller than zero and the corrected power result is positive zero; for case 20 the first input is positive infinity and the second input is greater than zero and the corrected power result is positive infinity; for case 21 the first input is a rational number other than one or the first input is infinity and the second input is NaN and the corrected power result is positive NaN; for case 22 the first input is NaN and the second input is not zero and the corrected power result is positive NaN; and for case 23 the first input is NaN and the second input is NaN and the corrected power result is positive NaN.

Example Embodiments with Corner Check Functionality in Multiple Instructions

Various embodiments discussed above use a corner check instruction that is executed after one or more other instructions to check corner cases for a power function. In other embodiments, multiple corner check instructions may be used, the other instructions may be modified, or both. For example, in some embodiments a corner check instruction pow_reduction operates on the x and y inputs to check and correct one or more corner cases prior to the other instructions. Further, a floating-point multiply instruction may be configured to handle one or more corner cases. Still further, a bit test instruction may test change the power result's sign bit if needed.

For example, consider the following example pseudocode for a floating-point power function:

```
float pow(float x, float y)
{
    float r, r1, r2;
    r1 = pow_reduction (x, y); // corner check instruction
    r2 = log2 ( abs(r1) );
    r2 = mul.pow (y, r2); // special multiply
    r2 = exp2 (r2);
    r = isel.bit_test (r1, #-0.0, r2, r2.neg)
    return r;
}
```

In this example, the pow_reduction instruction is a corner check instruction that checks and corrects corner cases for NaN, x equal to plus or minus 1.0, and y equal to zero. This instruction may also generate a sign flip bit to determine the sign of the final output. The mul.pow instruction specifies a floating-point multiply operation and also checks for multiplication of zero by NaN or zero by infinity (and may return zero for both cases). The isel.bit_text instruction may specify the following operation to test an arbitrary location of the r1 operand and change the sign bit if needed:

```
float isel_tst (int a, int b, float c, float d) {
    if ((a&b)!=0) return c;
    else return d;
}
```

In various embodiments, splitting corner check functionality among multiple instructions may reduce code size, execution time, power consumption, or any combination therefor, although perhaps not to the extent achievable using a single corner check instruction, e.g., as discussed in previous sections.

Example Device

Figure 6:
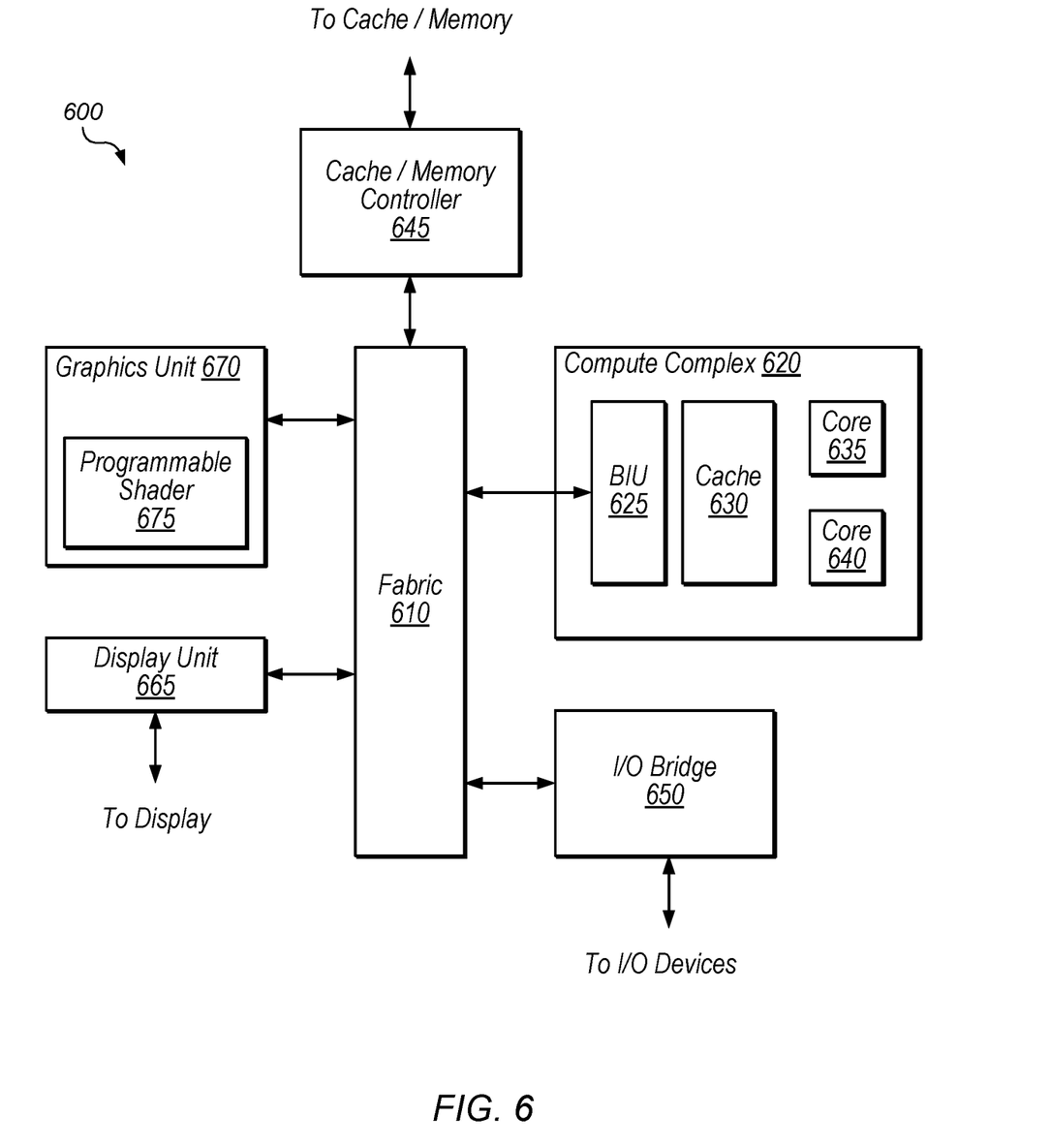
FIG. 6 is a block diagram illustrating an example computing device, according to some embodiments.

Referring now to FIG. 6, a block diagram illustrating an example embodiment of a device 600 is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620 input/output (I/O) bridge 650, cache/memory controller 645, graphics unit 670, and display unit 665. In some embodiments, device 700 may include other components (not shown) in addition to and/or in place of the illustrated components, such as video processor encoders and decoders, image processing or recognition elements, computer vision elements, etc.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores and/or caches. For example, compute complex 620 may include 1, 2, or 4 processor cores, or any other suitable number. In one embodiment, cache 630 is a set associative L2 cache. In some embodiments, cores 635 and/or 640 may include internal instruction and/or data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions.

Cache/memory controller 645 may be configured to manage transfer of data between fabric 610 and one or more caches and/or memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

As used herein, the term "coupled to" may indicate one or more connections between elements, and a coupling may include intervening elements. For example, in FIG. 6, graphics unit 670 may be described as "coupled to" a memory through fabric 610 and cache/memory controller 645. In contrast, in the illustrated embodiment of FIG. 6, graphics unit 670 is "directly coupled" to fabric 610 because there are no intervening elements.

Graphics unit 670 may include one or more processors and/or one or more graphics processing units (GPU's).

Graphics unit 670 may receive graphics-oriented instructions, such as OPENGL®, Metal, or DIRECT3D® instructions, for example. Graphics unit 670 may execute specialized GPU instructions or perform other operations based on the received graphics-oriented instructions. Graphics unit 670 may generally be configured to process large blocks of data in parallel and may build images in a frame buffer for output to a display. Graphics unit 670 may include transform, lighting, triangle, and/or rendering engines in one or more graphics processing pipelines. Graphics unit 670 may output pixel information for display images. Programmable shader 675, in various embodiments, may include highly parallel execution cores configured to execute graphics programs, which may include pixel tasks, vertex tasks, and compute tasks (which may or may not be graphics-related).

In some embodiments, graphics unit 670 includes the circuitry discussed herein. In other embodiments, the disclosed circuitry may be implemented in other types of processors, such as CPUs, for example.

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and/or low-power always-on functionality, for example. I/O bridge 650 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 650.

In some embodiments, device 600 includes network interface circuitry (not explicitly shown), which may be connected to fabric 610 or I/O bridge 650. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 600 with connectivity to various types of other devices and networks.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 7:
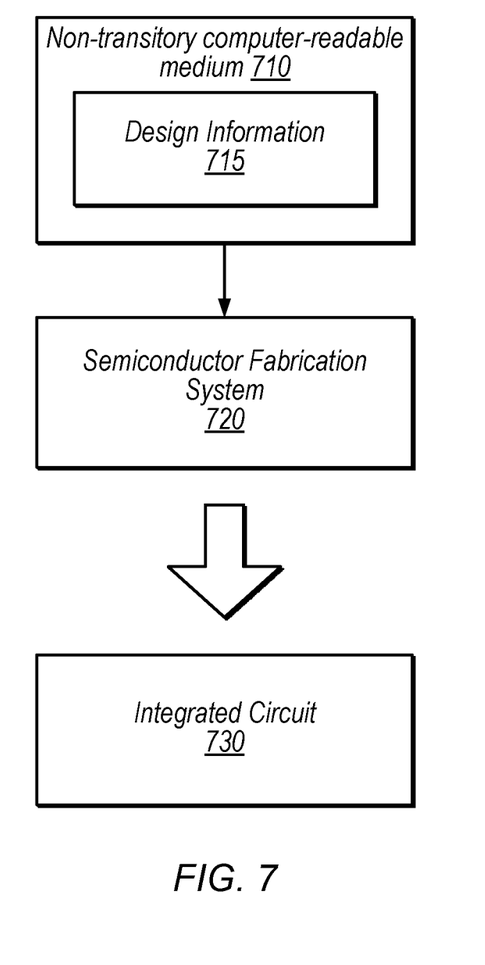
FIG. 7 is a block diagram illustrating an example computer-readable medium that stores circuit design information, according to some embodiments.

FIG. 7 is a block diagram illustrating an example non-transitory computer-readable storage medium that stores circuit design information, according to some embodiments. In the illustrated embodiment semiconductor fabrication system 720 is configured to process the design information 715 stored on non-transitory computer-readable medium 710 and fabricate integrated circuit 730 based on the design information 715.

Non-transitory computer-readable storage medium 710, may comprise any of various appropriate types of memory devices or storage devices. Non-transitory computer-readable storage medium 710 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 710 may include other types of non-transitory memory as well or combinations thereof. Non-transitory computer-readable storage medium 710 may include two or more memory mediums which may reside in different locations, e.g., in different computer systems that are connected over a network.

Design information 715 may be specified using any of various appropriate computer languages, including hardware description languages such as, without limitation: VHDL, Verilog, SystemC, SystemVerilog, RHDL, M, MyHDL, etc. Design information 715 may be usable by semiconductor fabrication system 720 to fabricate at least a portion of integrated circuit 730. The format of design information 715 may be recognized by at least one semiconductor fabrication system 720. In some embodiments, design information 715 may also include one or more cell libraries which specify the synthesis and/or layout of integrated circuit 730. In some embodiments, the design information is specified in whole or in part in the form of a netlist that specifies cell library elements and their connectivity. Design information 715, taken alone, may or may not include sufficient information for fabrication of a corresponding integrated circuit. For example, design information 715 may specify the circuit elements to be fabricated but not their physical layout. In this case, design information 715 may need to be combined with layout information to actually fabricate the specified circuitry.

Integrated circuit 730 may, in various embodiments, include one or more custom macrocells, such as memories, analog or mixed-signal circuits, and the like. In such cases, design information 715 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit 730 is configured to operate according to a circuit design specified by design information 715, which may include performing any of the functionality described herein. For example, integrated circuit 730 may include any of various elements shown in FIG. 1, 3, 4, or 6. Further, integrated circuit 730 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
 floating-point pipeline execution circuitry configured to generate a result for a floating-point power operation by executing multiple instructions, wherein the instructions include:
  one or more received instructions that specify to generate an initial power result of a first input raised to the power of a second input as $2^{(second\ input * log_2(first\ input))}$; and
  a received corner check instruction configured to operate on the first and second inputs;
 wherein the execution circuitry includes:
  floating-point datapath circuitry configured to perform the one or more received instructions to generate the initial power result; and
  corner check circuitry configured to perform the corner check instruction to:
   output a corrected power result based on detection of a corner condition for the first and second inputs; and
   output the initial power result based on a failure to detect any corner conditions in a set of corner conditions for the first and second inputs.

2. The apparatus of claim 1, wherein the corner check instruction is configured to receive the initial power result as an operand.

3. The apparatus of claim 1, wherein the corner check circuitry includes routing circuitry configured to utilize first circuitry that the apparatus is also configured to use for other floating-point operations performed by the floating-point pipeline, wherein the first circuitry includes at least one of the following circuits:
 comparator circuitry; and
 circuitry configured to detect a particular floating-point value.

4. The apparatus of claim 1, wherein the corner check circuitry includes odd integer detection circuitry that the apparatus is also configured to use for round to integer operations.

5. The apparatus of claim 1, wherein the corner check circuitry is configured to check for at least the following corner cases:
 the first input is plus 1.0 or minus 1.0;
 the second input is zero;
 the first input is negative and the second input is a finite odd integer; and
 the first input is negative and the second input is a finite non-integer.

6. The apparatus of claim 1, wherein the corner check circuitry is configured to output the following corrected power results: positive infinity, negative infinity, positive zero, negative zero, one, and NaN.

7. The apparatus of claim 1, wherein the corner check instruction is included in an instruction set architecture of a processor that includes the floating-point pipeline and is generated by a compiler.

8. The apparatus of claim 1, wherein the one or more received instructions that specify to generate an initial power result consist solely of:
 an instruction that determines log$_2$ of an input operand;
 a multiply instruction that multiplies two input operands; and
 an instruction that outputs two to the power of an input operand.

9. The apparatus of claim 1, wherein the apparatus is a computing device that includes:
 a processor that includes the floating-point pipeline execution circuitry; and
 network interface circuitry.

10. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
 floating-point pipeline execution circuitry configured to generate a result for a floating-point power operation by executing multiple instructions, wherein the instructions include:
  one or more received instructions that specify to generate an initial power result of a first input raised to the power of a second input as $2^{(second\ input * log_2(first\ input))}$; and
  a received corner check instruction configured to operate on the first and second inputs;
 wherein the execution circuitry includes:
  floating-point datapath circuitry configured to perform the one or more received instructions to generate the initial power result; and
  corner check circuitry configured to perform the corner check instruction to:

output a corrected power result based on detection of a corner condition for the first and second inputs; and output the initial power result based on a failure to detect any corner conditions in a set of corner conditions for the first and second inputs.

11. The non-transitory computer readable storage medium of claim 10, wherein the corner check instruction receives the initial power result as an operand and is configured to output a negated initial power result based on one or more corner cases.

12. The non-transitory computer readable storage medium of claim 10, wherein the corner check circuitry includes odd integer detection circuitry that the circuit is also configured to use for round to integer operations.

13. The non-transitory computer readable storage medium of claim 10, wherein the corner check circuitry includes routing circuitry configured to utilize first circuitry that the circuit is also configured to use for other floating-point operations performed by the floating-point pipeline, wherein the first circuitry includes any combination of one or more types of circuitry from the following group of types of circuitry:

comparator circuitry; and circuitry configured to detect a particular floating-point value.

14. The non-transitory computer readable storage medium of claim 10, wherein the corner check circuitry is configured to check for at least the following corner cases:

the first input is plus 1.0 or minus 1.0;

the second input is zero;

the first input is negative and the second input is a finite odd integer; and the first input is negative and the second input is a finite non-integer.

15. The non-transitory computer readable storage medium of claim 10, wherein the corner check circuitry is configured to output the following corrected power results: positive infinity, negative infinity, positive zero, negative zero, one, and NaN.

16. The non-transitory computer readable storage medium of claim 10, wherein the one or more received instructions that specify to generate an initial power result consist solely of:

an instruction that determines $\log_2$ of an input operand;

a multiply instruction that multiplies two input operands; and an instruction that outputs two to the power of an input operand.

17. A method, comprising:

generating, by floating-point circuitry, a result for a floating-point power operation by executing multiple instructions, including:

executing, by floating-point datapath circuitry, one or more received instructions that specify to generate an initial power result of a first input raised to the power of a second input as $2^{(second\ input * \log_2(first\ input))}$; and executing, by corner check circuitry, a received corner check instruction that operates on the first and second inputs;

wherein executing the corner check instruction outputs a corrected power result based on detection of a corner condition for the first and second inputs.

18. The method of claim 17, wherein the corner check instruction receives the initial power result as an operand.

19. The method of claim 17, wherein executing the corner check instruction includes determining whether the second input is an odd integer using odd integer detection circuitry; and wherein the method further comprising using the odd integer detection circuitry to execute a round to integer instruction.

20. The method of claim 17, wherein executing the corner check instruction includes checking for at least the following corner cases:

the first input is plus 1.0 or minus 1.0;

the second input is zero;

the first input is negative and the second input is a finite odd integer; and the first input is negative and the second input is a finite non-integer.

* * * * *

UNITED STATES PATENT AND TRADEMARK OFFICE
CERTIFICATE OF CORRECTION

PATENT NO. : 11,372,621 B2
APPLICATION NO. : 16/893051
DATED : June 28, 2022
INVENTOR(S) : Anthony Y. Tai et al.

It is certified that error appears in the above-identified patent and that said Letters Patent is hereby corrected as shown below:

In the Claims

Column 14, Line 35, Claim 8 delete "logy" and insert -- $log_2$ --

Column 16, Line 5, Claim 16 delete "logy" and insert -- $log_2$ --

Signed and Sealed this
Twenty-third Day of May, 2023

Katherine Kelly Vidal
*Director of the United States Patent and Trademark Office*